United States Patent
Kameda et al.

(10) Patent No.: US 12,097,591 B2
(45) Date of Patent: Sep. 24, 2024

(54) METHOD FOR DETERMINING PROPELLING CONDITION FOR SHOT MEDIUM, AND METHOD FOR MANUFACTURING COIL SPRING

(71) Applicants: Hitachi Astemo, Ltd., Hitachinaka (JP); HONDA MOTOR CO., LTD., Tokyo (JP)

(72) Inventors: Hirokatsu Kameda, Hitachinaka (JP); Toshihiro Ogawa, Kasugai (JP); Shinji Kasatori, Tokyo (JP); Hideki Kato, Tokyo (JP); Keiichi Maekawa, Tokyo (JP); Kentaro Tokita, Tokyo (JP); Kenji Nagaoka, Tokyo (JP); Atsushi Murakami, Tokyo (JP)

(73) Assignees: Hitachi Astemo, Ltd., Hitachinaka (JP); HONDA MOTOR CO., LTD., Tokyo (JP)

( * ) Notice: Subject to any disclaimer, the term of this patent is extended or adjusted under 35 U.S.C. 154(b) by 196 days.

(21) Appl. No.: 17/946,694

(22) Filed: Sep. 16, 2022

(65) Prior Publication Data
US 2023/0016208 A1    Jan. 19, 2023

Related U.S. Application Data

(63) Continuation of application No. PCT/JP2021/008611, filed on Mar. 5, 2021.

(30) Foreign Application Priority Data

Mar. 24, 2020    (JP) .................................. 2020-052303

(51) Int. Cl.
*B24C 1/10*    (2006.01)
*B05D 3/12*    (2006.01)
(Continued)

(52) U.S. Cl.
CPC ................ *B24C 1/10* (2013.01); *B05D 3/12* (2013.01); *B21F 35/00* (2013.01); *B60G 11/14* (2013.01);
(Continued)

(58) Field of Classification Search
CPC ............................. B24C 1/10; Y10T 29/479
See application file for complete search history.

(56) References Cited

U.S. PATENT DOCUMENTS 6,544,360 B1    4/2003  Tange et al.
6,651,299 B2 *  11/2003 Mitsubayashi ......... B24C 3/086
                                                       474/272
(Continued)

FOREIGN PATENT DOCUMENTS

CN         1354802 A     6/2002
CN       103196916 A     7/2013
(Continued)

OTHER PUBLICATIONS

Indian Office Action mailed Oct. 28, 2022 for the corresponding Indian Patent Application No. 202247046017 (5 pages).
(Continued)

*Primary Examiner* — Sarang Afzali
(74) *Attorney, Agent, or Firm* — Leason Ellis LLP; Edward J. Ellis; Melvin C. Garner

(57) ABSTRACT

The invention relates to a method for manufacturing a coil spring and for determining a propelling condition for a shot medium. In a case where it is confirmed that the coating film remains in a third step, at least one or more of conditions of the shot peening treatment including a propelling speed of the shot medium, a propelling time of the shot medium, a material of the shot medium, and an average particle diameter of the shot medium are changed and the second step and the third step are repeated until the coating film does not
(Continued)

remain. In a case where it is confirmed that the coating film does not remain in the third step, the condition of the shot peening treatment in the second step in which the coil spring is obtained with no remaining coating film is determined as the propelling condition for the shot medium.

18 Claims, 6 Drawing Sheets

(51) Int. Cl.
*B21F 35/00* (2006.01)
*B60G 11/14* (2006.01)
*C21D 7/06* (2006.01)

(52) U.S. Cl.
CPC .......... *C21D 7/06* (2013.01); *B60G 2206/426* (2013.01); *G05B 2219/32182* (2013.01); *Y10T 29/479* (2015.01); *Y10T 29/49611* (2015.01); *Y10T 29/49982* (2015.01)

(56) References Cited

U.S. PATENT DOCUMENTS

| | | | |
|---|---|---|---|
| 10,583,706 B2* | 3/2020 | Tange | C21D 7/06 |
| 11,045,922 B2* | 6/2021 | Iwata | G05B 19/41875 |
| 2014/0352450 A1 | 12/2014 | Haubold et al. | |
| 2017/0209982 A1 | 7/2017 | Sugiura et al. | |
| 2019/0143482 A1 | 5/2019 | Iwata et al. | |
| 2019/0160906 A1 | 5/2019 | Umeno | |

FOREIGN PATENT DOCUMENTS

| | | |
|---|---|---|
| JP | 2020159098 A | 10/2020 |
| WO | 2015136737 A1 | 9/2015 |
| WO | 2017199959 A1 | 11/2017 |

OTHER PUBLICATIONS

International Search Report mailed May 11, 2021 for the corresponding PCT International Patent Application No. PCT JP2021/008611 ( 5 pages including English translation).

* cited by examiner

METHOD FOR DETERMINING PROPELLING CONDITION FOR SHOT MEDIUM, AND METHOD FOR MANUFACTURING COIL SPRING

CROSS-REFERENCE TO RELATED APPLICATION(S)

This application is a Continuation of International Application No. PCT/JP2021/008611 filed on Mar. 5, 2021, which claims the benefit of priority to Japanese Patent Application No. 2020-052303 filed on Mar. 24, 2020, the contents of all of which are incorporated herein by reference in their entireties.

FIELD OF THE INVENTION

The present invention relates to a method for determining a propelling condition for a shot medium and a method for manufacturing a coil spring.

BACKGROUND OF THE INVENTION

A coil spring improved in fatigue strength by propelling shot medium called shot onto a surface of the coil spring and applying residual stress is known. There is a technique disclosed in WO-A-2017/199959 as a surface treatment processing method for a treatment object including a coil spring.

Paragraph [0007] of WO-A-2017/199959 states that "including a shot treatment step of performing a shot treatment to propel shot medium onto the treatment object under a shot treatment condition set in the condition setting step and a second inspection step of non-destructively inspecting at least one of the state and external dimensions of the treatment object on the surface side after the shot treatment step".

In addition, paragraph [0018] states that "in the second inspection step, at least the residual stress on the surface side of each treatment object to be inspected is measured. The method for the measurement is a method using a stress measuring device including an X-ray generation source, a first detection element, a second detection element, and a moving mechanism".

According to the invention disclosed in WO-A-2017/199959, it is possible to manage the degree of processing of every shot-processed treatment object.

For example, in a case where the invention disclosed in WO-A-2017/199959 is applied to a method for manufacturing a coil spring, a form in which a stress measuring device is used when determining a propelling condition for a shot medium is conceivable. In general, the stress measuring device is expensive. Accordingly, in this form, a cost in determining the propelling conditions for the shot medium is high.

SUMMARY OF THE INVENTION

An object of the present invention is to provide a method for determining a propelling condition for a shot medium, which can determine the propelling conditions for the shot medium inexpensively, and the like.

As a result of diligent studies, the present inventors have found that whether or not a propelling condition for a shot medium in a shot peening treatment is appropriate can be inexpensively grasped by performing a shot peening treatment on a coil spring where a coating film is formed and then visually checking whether or not the coating film remains.

Further, the present inventors have found that a part with a changed winding angle is less likely to collide with shot medium than the other part in a case where so-called closed-end and open-end coil springs in which winding angles at least at axial end portions of the coil springs are changed are manufactured through stress shot peening treatments as coil springs for use in a suspension device of a saddle-type vehicle on which an occupant straddles, examples of which include two-wheeled and three-wheeled vehicles. From a viewpoint of increasing fatigue strength of the coil spring as a whole, it is preferable to cause shot medium to collide with every part of the coil spring and it is preferable to cause shot medium to collide with a winding angle-changed part as well. According to what has been found by the present inventors, conditions of the stress shot peening treatment including a change in compressive load can be determined as the propelling condition for the shot medium in a stress shot peening treatment of a coil spring with the stress shot peening treatment performed on the coil spring where a coating film is formed and the coating film not remaining visually confirmed and then the propelling conditions can be grasped inexpensively. It is conceivable that the coil spring can be inexpensively manufactured by using the propelling conditions grasped in this manner as coil spring manufacturing conditions. The present invention has been completed based on such findings.

Hereinafter, the present disclosure will be described. The "conditions of shot peening treatment" in the present invention are a concept including conditions for a shot medium and conditions for a coil spring. In addition, the "propelling conditions for the shot medium" in the present invention can include the conditions for a coil spring colliding with shot medium such as a gap between axially adjacent coil spring windings (coil spring pitch) and a magnitude of a compressive load applied to the coil spring in addition to the conditions for the shot medium themselves represented by, for example, a propelling speed, a propelling time, a material, an average particle diameter, and a propelling angle of the shot medium.

According to one aspect of the present disclosure, there is provided a method for determining a propelling condition for a shot medium including: a first step of forming a coating film on a surface of a coil spring; a second step of performing a shot peening treatment of propelling the shot medium onto the coil spring where the coating film is formed; and a third step of checking whether or not the coating film remains on the coil spring where the shot peening treatment is performed. In a case where the coating film is confirmed to remain in the third step, at least one or more of conditions of the shot peening treatment including a propelling speed of the shot medium, a propelling time of the shot medium, a material of the shot medium, and an average particle diameter of the shot medium are changed and the second step and the third step are repeated until the coating film does not remain. In a case where the coating film is not confirmed to remain in the third step, the condition of the shot peening treatment in the second step in which the coil spring is obtained with no remaining coating film is determined as the propelling condition for the shot medium.

According to another aspect of the present disclosure, there is provided a method for manufacturing a coil spring including: a condition determination step of determining conditions of a shot peening treatment by the method for determining the propelling condition for the shot medium; and a shot peening step of performing a shot peening treatment on a coil spring using the condition determined in the condition determination step.

According to the present invention, it is possible to provide a method for determining a propelling condition for a shot medium, which can determine the propelling conditions for the shot medium inexpensively, and the like.

DETAILED DESCRIPTION OF THE INVENTION

An embodiment of the present invention will be described below with reference to the accompanying drawings. A form illustrated in the accompanying drawings is an example of the present invention, and the present invention is not limited to the form.

1. Method for Determining Propelling Condition for Shot Medium

Figure 1:
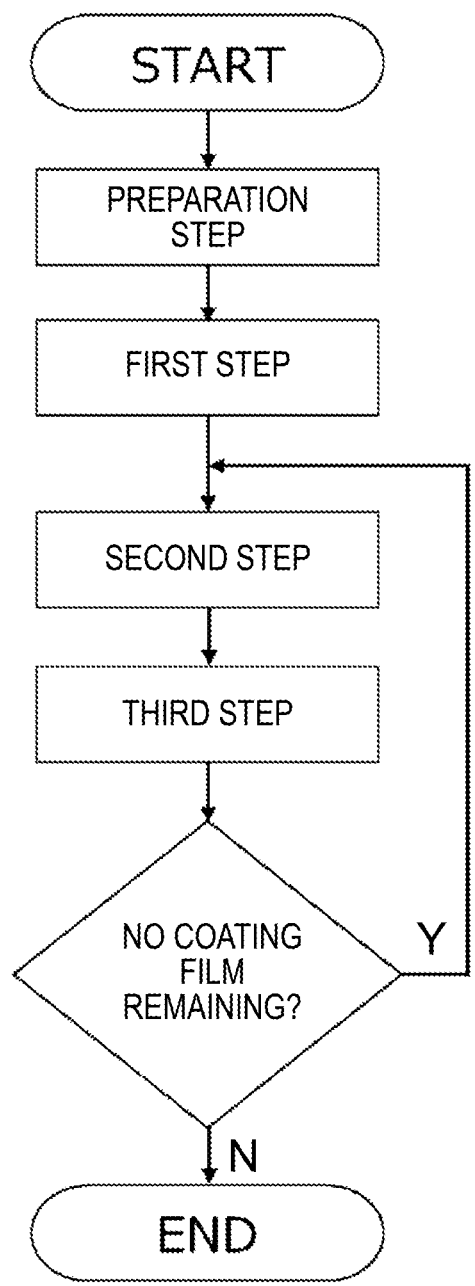
FIG. 1 is a flowchart illustrating a method for determining a propelling condition for a shot medium according to the present invention.

FIG. 1 is a flowchart illustrating a method for determining a propelling condition for a shot medium according to the present invention (hereinafter, referred to as "determination method of the present invention" in some cases). As illustrated in FIG. 1, the determination method of the present invention includes a preparation step, a first step, a second step, and a third step.

1.1. Preparation Step

Figure 2:
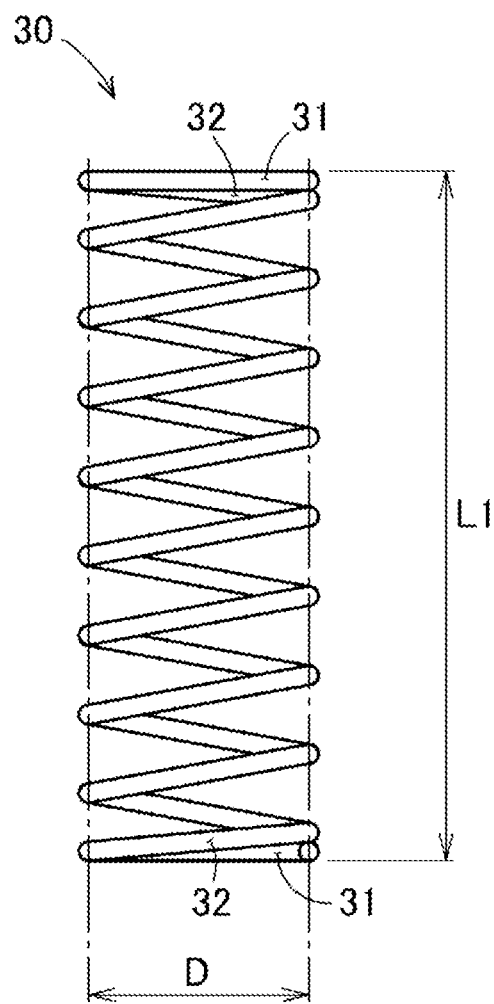
FIG. 2 is a diagram illustrating a preparation step.

FIG. 2 is a diagram illustrating the preparation step. The preparation step is a step of preparing a coil spring to go through the steps starting from the first step to be described later. A form of a coil spring 30 prepared in the preparation step is not particularly limited.

In the preparation step, it is possible to prepare a coil spring for use in, for example, the front fork disposed between the vehicle body and front wheel of a saddle-type vehicle on which an occupant straddles or the rear cushion disposed between the vehicle body and rear wheel of the saddle-type vehicle. The coil spring 30 illustrated in FIG. 2 can be exemplified as such a coil spring.

In the coil spring 30, which has a free length of L1 and a coil center diameter of D, a winding angle is changed only at windings 31 and 31 at both end portions and, as a result, the windings 31 and 31 at both end portions are in contact with adjacent windings 32 and 32, respectively. In other words, the coil spring 30 is a closed-end coil spring.

In a case where the closed-end coil spring is prepared in the preparation step, the coil spring may be a two-stage pitch spring whose winding angle changes in two stages or may be a spring whose winding angle changes in three or more stages as well as a one-stage pitch spring as illustrated in FIG. 2, whose winding angle changes in one stage only at the end portion.

In addition, the coil spring prepared in the preparation step is not limited to the closed-end coil spring illustrated in FIG. 2. The coil spring prepared in the preparation step may be an open-end coil spring in which windings at both end portions are close to windings adjacent to the windings by a winding angle at the end portion-including part being changed. Here, in the present invention, "a winding at end portion is close to a winding adjacent to the winding" means that a gap between a winding at end portion and a winding adjacent to the winding is 3 mm or less.

1.2. First Step

Figure 3A:
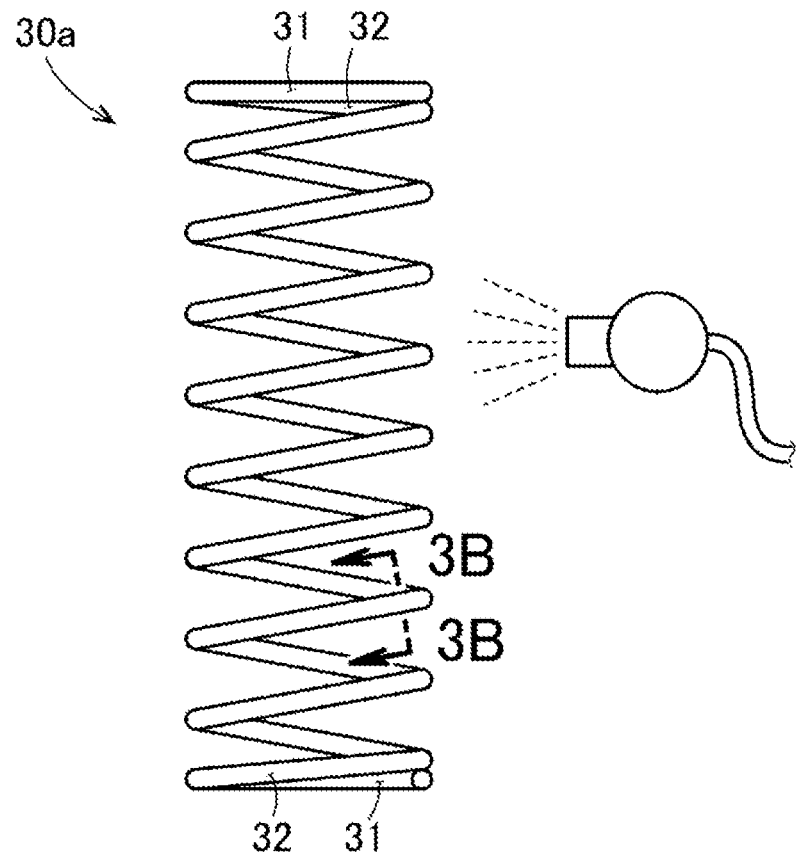
FIG. 3A is a diagram illustrating a first step.

The first step is a step of forming a coating film on a surface of the coil spring prepared in the preparation step. How to form the coating film on the surface of the coil spring is not particularly limited. For example, the coating film can be formed on the surface of the coil spring by brush coating, air spray coating, dip coating, electrostatic coating, electrodeposition coating, powder coating, or the like. From a viewpoint of, for example, facilitating uniform coating film formation on the entire circumference of the coil spring, it is preferable that the first step is a step of forming a coating film on the surface of the coil spring by electrostatic coating as illustrated in FIG. 3A.

Figure 3B:
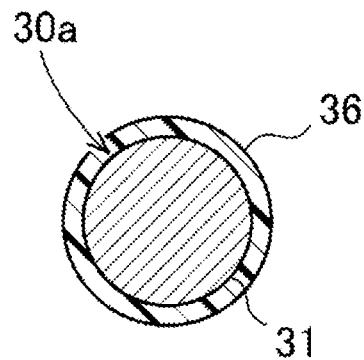
FIG. 3B is a cross-sectional view taken along line 3B-3B of FIG. 3A.

By performing the first step, a coil spring 30a where a coating film 36 is formed on the entire circumference of the coil spring can be obtained as illustrated in, for example, FIG. 3B. The material and thickness of the coating film 36 formed in the first step are not particularly limited.

The coating film 36 can be formed by using, for example, a melamine resin paint or the like. In addition, the thickness of the coating film 36 can be, for example, 125 μm or more and 150 μm or less.

As described later, in the closed-end or open-end coil spring in which the winding angle at the end portion-including part is changed, shot medium is less likely to collide with the winding angle-changed part than in a coil spring in which a winding angle does not change over the entire length, and thus a form of shot medium collision is likely to differ depending on the part of the coil spring. In a case where the closed-end or open-end coil spring is prepared in the preparation step, it is preferable to check a state of coating film remaining on the entire circumference of the coil spring in the third step to be described later. In this regard, from a viewpoint of making it possible to check the state of coating film remaining on the entire circumference of the coil spring, it is preferable that the first step is a step of forming a coating film on the entire circumference of the coil spring.

1.3. Second Step

The second step is a step of performing a shot peening treatment for propelling shot medium on the coil spring where the coating film is formed in the first step. The shot peening treatment in the second step may be a shot peening treatment performed without applying a compressive load to the coil spring or may be a stress shot peening treatment performed with a compressive load applied to the coil spring.

In addition, the shot peening treatment may be performed on the coil spring which is heated or the shot peening treatment may be performed on the coil spring which is not heated. From a viewpoint of easily and inexpensively manufacturing a high-fatigue strength coil spring, it is preferable to include a step of performing a stress shot peening treatment on an unheated coil spring at room temperature.

Accordingly, in a case where the determination method of the present invention is carried out in order to determine a manufacturing condition for easily and inexpensively manufacturing a high-fatigue strength coil spring, it is preferable that the second step is a step of performing a stress shot peening treatment on an unheated coil spring at room temperature.

Figure 4A:
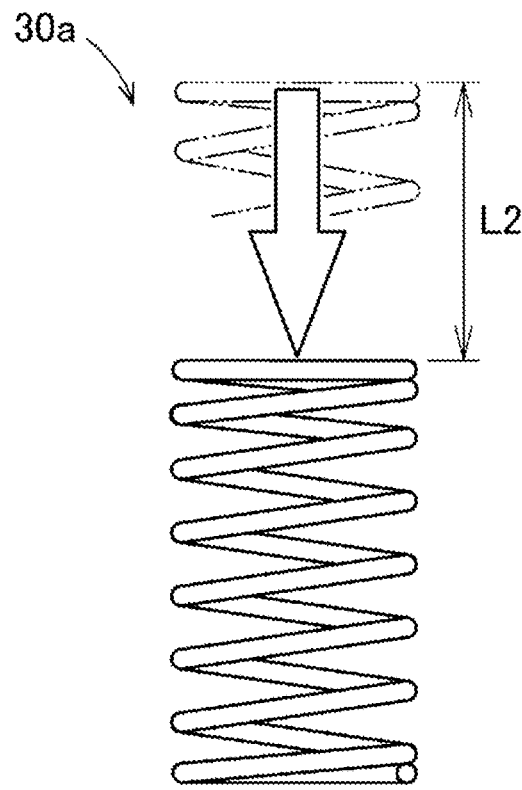
FIG. 4A is a diagram illustrating coil spring compression.
Figure 4B:
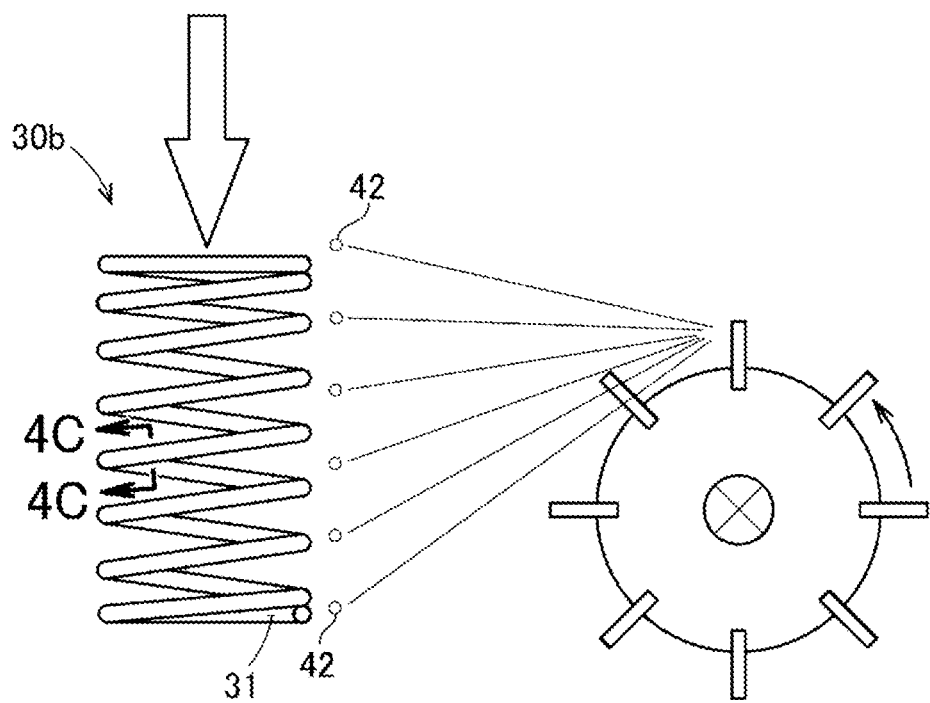
FIG. 4B is a diagram illustrating stress shot peening.
Figure 4C:
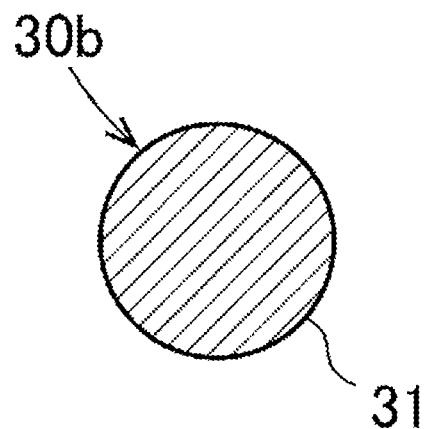
FIG. 4C is a cross-sectional view taken along line 4C-4C of FIG. 4B.

In a case where the second step of such a form is performed, the coil spring 30a is compressed by a length L2 as illustrated in FIG. 4A. Subsequently, as illustrated in FIG. 4B, a shot peening treatment is performed on the coil spring 30a while maintaining a state where the compressive load is applied to the coil spring 30a. In other words, a stress shot peening treatment is performed on the coil spring 30a. As a result, a stress shot-peened coil spring 30b can be obtained.

From a viewpoint of, for example, easily applying a sufficient compressive residual stress in a short time in the second step of the above form, it is preferable that a compression rate defined by (L1−L2)/L1 is 0.45 or more as to the length L2 at which the coil spring 30a is compressed. In addition, it is preferable that the compression rate is 0.7 or less from the viewpoint of, for example, easily applying a sufficient compressive residual stress. In other words, the compression rate in the second step is preferably 0.45 or more and 0.7 or less. By compression in a range in which the compression rate is 0.45 or more and 0.7 or less, a sufficient compressive residual stress can be applied, and thus a fatigue strength-improved coil spring is manufactured with ease.

1.4. Third Step

The third step is a step of checking whether or not the coating film remains on the coil spring where the shot peening treatment is performed in the second step. From a viewpoint of being capable of inexpensively determining the propelling condition for the shot medium, it is preferable that the third step is a step of visually checking whether or not the coating film remains.

In a case where the second step is a step of obtaining the coil spring 30b, the third step is a step of checking whether or not the coating film 36 remains on the coil spring 30b. Here, in the closed-end coil spring 30b in which the winding angle at the end portion—including part is changed, shot medium 42 are less likely to collide with the winding angle—changed part than in a coil spring in which a winding angle does not change over the entire length, and thus the coating film 36 is more likely to remain. Accordingly, it is preferable that the third step is a step of checking whether or not the coating film remains on the entire circumference of the coil spring.

In a case where the coating film is confirmed to remain in the third step, at least one or more of conditions of the shot peening treatment including at least a propelling speed, a propelling time, a material, and an average particle diameter of the shot medium are changed and the second step and the third step are repeated until the coating film does not remain.

On the other hand, in a case where the coating film is not confirmed to remain in the third step, the condition of the shot peening treatment in the second step in which the coil spring is obtained with no remaining coating film is determined as the propelling condition for the shot medium.

For example, in a case where the second step is a step of obtaining the stress shot-peened coil spring 30b and the coating film 36 is confirmed to remain in the third step, at least one or more of conditions of the shot peening treatment including at least a propelling speed of the shot medium 42, a propelling time of the shot medium 42, a material of the shot medium 42, an average particle diameter of the shot medium 42, a propelling angle of the shot medium 42, and a magnitude of a compressive load applied to the coil spring 30a are changed and the second step and the third step are repeated until the coating film 36 does not remain.

On the other hand, in a case where the coating film 36 is not confirmed to remain in the third step, the condition of the shot peening treatment (stress shot peening treatment) in the second step in which the coil spring 30b is obtained with no remaining coating film 36 is determined as a propelling condition for the shot medium 42.

Figure 5A:
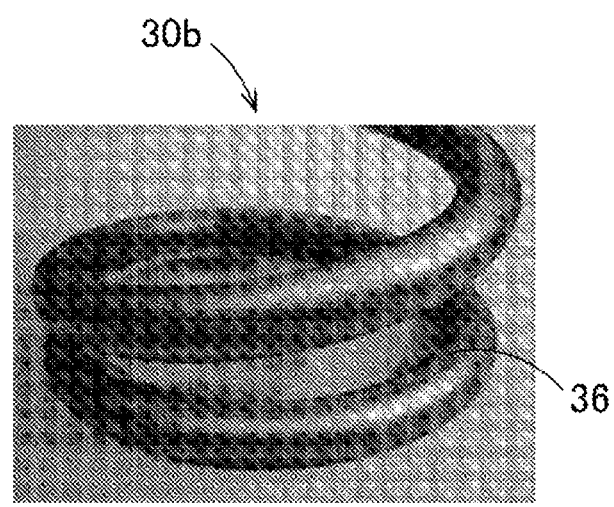
FIG. 5A is a diagram illustrating an example in which a coating film remains.
Figure 5B:
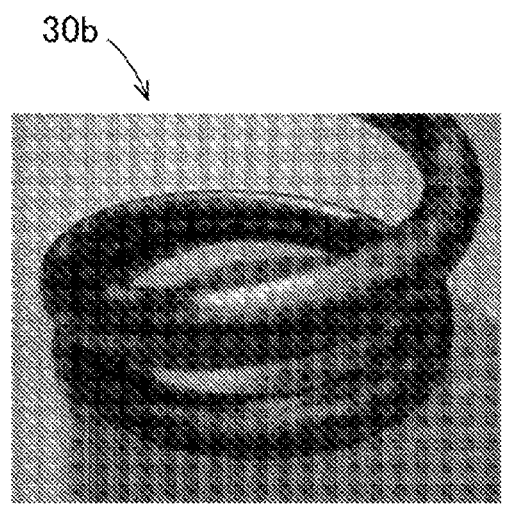
FIG. 5B is a diagram illustrating an example in which no coating film remains.

In the determination method of the present invention, when the coil spring is in a state illustrated in, for example, FIG. 5A, the coating film 36 remains at the part indicated by an arrow, and thus it can be determined that the coating film 36 remains. More specifically, it can be determined that there is a difference in a state of remaining of the coating film 36 depending on the part of the coil spring 30b. On the other hand, when the coil spring is in a state illustrated in, for example, FIG. 5B, it can be determined that the coating film 36 does not remain.

Here, in a case where the coating film 36 is confirmed to remain in the third step and there is a difference in the state of remaining of the coating film 36 depending on the part of the coil spring 30b (for each part of the coil spring 30b), the coil spring 30b has a part where the shot medium 42 are likely to collide and a part where the shot medium 42 are unlikely to collide. If there is a part where the shot medium 42 are unlikely to collide, it is difficult to increase the compressive residual stress at the part, and thus the part may be damaged when the coil spring is used. In this regard, from a viewpoint of, for example, easily manufacturing a fatigue strength-improved coil spring, it is preferable to reduce a damage-prone part (that is, part where the shot medium 42 are unlikely to collide). In order to reduce the part where the shot medium 42 are unlikely to collide, it is considered effective to change an angle at the time of collision between the shot medium 42 and the coil spring 30b. As a method for changing the angle, it is conceivable to change a magnitude of a compressive load applied to the coil spring 30b or the propelling angle of the shot medium 42 propelled toward the coil spring 30b. In this regard, in a case where the coating film 36 is confirmed to remain in the third step and there is a difference in the state of remaining of the coating film 36 depending on the part of the coil spring 30b, it is preferable to change at least one of the magnitude of the compressive load applied to the coil spring and the propelling angle of the shot medium 42.

On the other hand, in a case where the coating film 36 is confirmed to remain in the third step and there is no difference in the state of remaining of the coating film 36 depending on the part of the coil spring 30b (for each part of the coil spring 30b), it is considered that the shot medium 42 evenly collides with the coil spring 30b. In this regard, in this case, from a viewpoint of, for example, achieving a state where the coating film 36 does not remain in a shorter time than a time of the second step in which the coil spring 30b is obtained, the conditions of the second step can be changed by selecting one or more selected from increasing the propelling speed of the shot medium 42, making the material of the shot medium 42 hard, and increasing the average particle diameter of the shot medium 42 as compared with the conditions of the second step. Meanwhile, in a case where the propelling speed, the material, and the average particle diameter of the shot medium 42 are not changed from the conditions of the second step in which the coil spring 30b is obtained, the conditions of the second step can be changed so as to increase the propelling time of the shot medium 42.

According to the determination method of the present invention described above, by checking whether or not the coating film remains, the propelling condition for the shot medium in which the coating film does not remain can be determined without using an expensive device such as a stress measuring device. In the determination method of the present invention, "coating film does not remain" means that the coating film formed before the shot peening treatment is performed is removed by the shot medium. Therefore, according to the present invention, it is possible to inexpensively determine the propelling condition for the shot medium which allows the shot medium to evenly collide with a surface of the coil spring.

2. Method for Manufacturing Coil Spring

Figure 6:
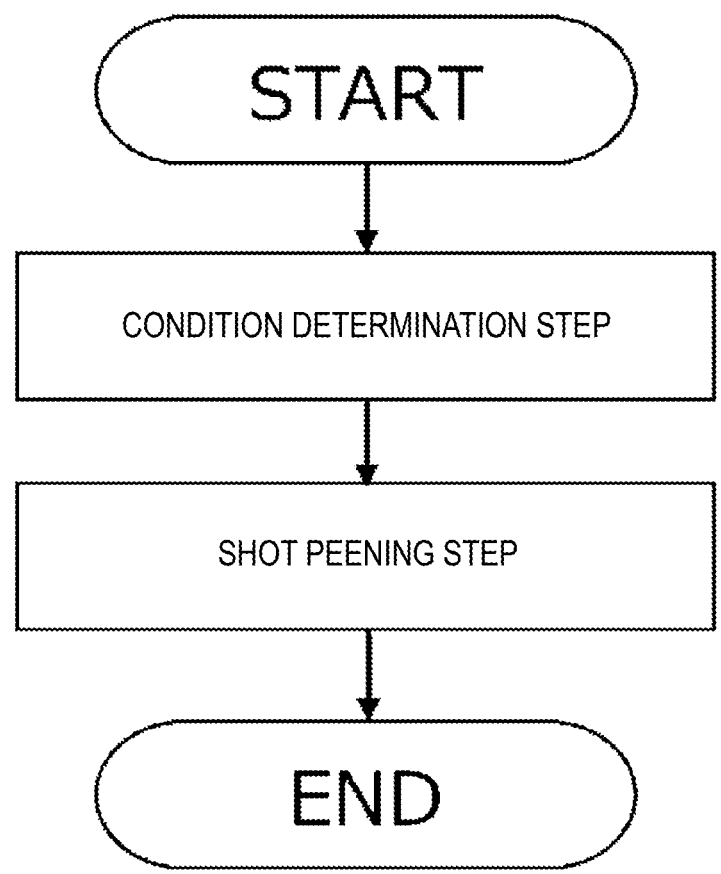
FIG. 6 is a flowchart illustrating a method for manufacturing a coil spring according to the present invention.

FIG. 6 is a flowchart illustrating a method for manufacturing a coil spring according to the present invention (hereinafter, referred to as "manufacturing method of the present invention" in some cases). As illustrated in FIG. 6, the manufacturing method of the present invention includes a condition determination step and a shot peening step.

2.1. Condition Determination Step

The condition determination step is a step of determining conditions of a shot peening treatment by the method for determining the propelling condition for the shot medium described above. Details of the method for determining the propelling condition for the shot medium are as described above, and thus description thereof will be omitted here. As a result of the condition determination step, it is possible to inexpensively determine the propelling condition for the shot medium which allows the shot medium to evenly collide with the surface of the coil spring.

2.2. Shot Peening Step

The shot peening step is a step of performing the shot peening treatment on the coil spring using the condition determined in the condition determination step. In the condition determination step, the propelling condition for the shot medium which allows the shot medium to evenly collide with the surface of the coil spring is determined inexpensively. Accordingly, by performing the shot peening treatment under the propelling condition, a fatigue strength-improved coil spring can be manufactured inexpensively.

The shot peening step may be in a form of performing the shot peening treatment on the coil spring to which no compressive load is applied or may be in a form of a stress shot peening in which the shot peening treatment is performed on a coil spring to which a compressive load is applied. A pitch of the compressive load-applied coil spring is small, and thus it is difficult for the shot medium to evenly collide with the surface of the coil spring as compared with the coil spring to which no compressive load is applied. In this respect, in the manufacturing method of the present invention, according to the determination method of the present invention, the propelling condition for the shot medium in stress shot peening which allows the shot medium to evenly collide with the surface of the coil spring can be determined, and thus the shot medium are capable of evenly colliding with the surface of the coil spring even in stress shot peening.

The coil spring on which the shot peening treatment is performed in the shot peening step may be a coil spring with a winding angle which does not change over the entire length. In addition, the coil spring may be a so-called closed-end coil spring in which a winding at an end portion is in contact with a winding adjacent to the winding by the winding angle at an end portion-including part being changed or a so-called open-end coil spring in which a winding at an end portion is close to a winding adjacent to the winding by the winding angle at an end portion-including part being changed. In the closed-end or open-end coil spring, a gap between, for example, a winding at an end portion and a winding adjacent to the winding is narrow, and thus it is difficult for the shot medium to collide with the winding at the end portion. In this respect, in the manufacturing method of the present invention, according to the determination method of the present invention, the propelling condition for the shot medium which allows the shot medium to evenly collide with a surface of the closed-end or open-end coil spring can be determined, and thus the shot medium are capable of evenly colliding with the surface of the coil spring even in the closed-end or open-end coil spring.

The shot peening step may be in a form of performing the shot peening treatment on the heated coil spring or may be in a form of performing the shot peening treatment on the unheated coil spring. A coil spring heating device is required for coil spring heating. Accordingly, from a viewpoint of enabling inexpensive coil spring manufacturing, it is preferable to perform the shot peening treatment on the unheated coil spring at room temperature.

The manufacturing method of the present invention described above includes the condition determination step of determining conditions of the shot peening treatment by the determination method of the present invention. According to this condition determination step, it is possible to inexpensively determine the propelling condition for the shot medium which allows the shot medium to evenly collide with the surface of the coil spring. Therefore, according to the manufacturing method of the present invention, by which the coil spring is manufactured through the process of performing the shot peening treatment under the condition determined by this condition determination step, a fatigue strength-improved coil spring can be manufactured inexpensively.

A coil spring manufactured by a manufacturing method of the present invention is suitable as a suspension device spring in a saddle-type vehicle.

The invention claimed is:

1. A method for determining a propelling condition for a shot medium, the method comprising:
    a first step of forming a coating film on a surface of a coil spring;
    a second step of performing a shot peening treatment of propelling the shot medium onto the coil spring where the coating film is formed; and
    a third step of visually checking whether or not the coating film remains on the coil spring where the shot peening treatment is performed, wherein:
    in a case where it is visually confirmed that the coating film remains in the third step, at least one or more of conditions of the shot peening treatment including a propelling speed of the shot medium, a propelling time of the shot medium, a material of the shot medium, and an average particle diameter of the shot medium are changed and the second step and the third step are repeated until the coating film does not remain; and
    in a case where it is visually confirmed that the coating film does not to remain in the third step, the condition of the shot peening treatment in the second step in which the coil spring is obtained with no remaining coating film is determined as the propelling condition for the shot medium.

2. The method for determining the propelling condition for the shot medium according to claim 1, wherein
the shot peening treatment is a stress shot peening treatment performed in a state where a compressive load is applied to the coil spring.

3. The method for determining the propelling condition for the shot medium according to claim 2, wherein:
the conditions of the shot peening treatment further include a magnitude of a compressive load applied to the coil spring and a propelling angle of the shot medium;
in a case where the coating film is confirmed to remain in the third step and there is a difference in a state of remaining of the coating film depending on a part of the coil spring, at least one of the magnitude of the compressive load applied to the coil spring and the propelling angle of the shot medium is changed; and
in a case where the coating film is confirmed to remain in the third step and there is no difference in the state of remaining of the coating film depending on the part of the coil spring, at least one or more selected from a group consisting of the propelling speed of the shot medium, the propelling time of the shot medium, the material of the shot medium, and a size of the shot medium are changed.

4. The method for determining the propelling condition for the shot medium according to claim 1, wherein
a winding angle of a portion of the coil spring including an end portion thereof is changed such that a winding at the end portion is in contact with or close to a winding adjacent to the winding at the end portion.

5. The method for determining the propelling condition for the shot medium according to claim 2, wherein
a winding angle of a portion of the coil spring including an end portion thereof is changed such that a winding at the end portion is in contact with or close to a winding adjacent to the winding at the end portion.

6. The method for determining the propelling condition for the shot medium according to claim 3, wherein
a winding angle of a portion of the coil spring including an end portion thereof is changed such that a winding at the end portion is in contact with or close to a winding adjacent to the winding at the end portion.

7. A method for manufacturing a coil spring, the method comprising:
a condition determination step of determining conditions of a shot peening treatment by the method for determining the propelling condition for the shot medium according to claim 1; and
a shot peening step of performing a shot peening treatment on a coil spring using the condition determined in the condition determination step.

8. The method for manufacturing the coil spring according to claim 7, wherein the shot peening treatment is a shot peening treatment performed on the coil spring which is not heated.

9. A method for manufacturing a coil spring, the method comprising:
a condition determination step of determining conditions of a shot peening treatment by the method for determining the propelling condition for the shot medium according to claim 2; and
a shot peening step of performing a shot peening treatment on a coil spring using the condition determined in the condition determination step.

10. The method for manufacturing the coil spring according to claim 9, wherein
the shot peening treatment is a shot peening treatment performed on the coil spring which is not heated.

11. A method for manufacturing a coil spring, the method comprising:
a condition determination step of determining conditions of a shot peening treatment by the method for determining the propelling condition for the shot medium according to claim 3; and
a shot peening step of performing a shot peening treatment on a coil spring using the condition determined in the condition determination step.

12. The method for manufacturing the coil spring according to claim 11, wherein
the shot peening treatment is a shot peening treatment performed on the coil spring which is not heated.

13. A method for manufacturing a coil spring, the method comprising:
a condition determination step of determining conditions of a shot peening treatment by the method for determining the propelling condition for the shot medium according to claim 4; and
a shot peening step of performing a shot peening treatment on a coil spring using the condition determined in the condition determination step.

14. The method for manufacturing the coil spring according to claim 13, wherein
the shot peening treatment is a shot peening treatment performed on the coil spring which is not heated.

15. A method for manufacturing a coil spring, the method comprising:
a condition determination step of determining conditions of a shot peening treatment by the method for determining the propelling condition for the shot medium according to claim 5; and
a shot peening step of performing a shot peening treatment on a coil spring using the condition determined in the condition determination step.

16. The method for manufacturing the coil spring according to claim 15, wherein
the shot peening treatment is a shot peening treatment performed on the coil spring which is not heated.

17. A method for manufacturing a coil spring, the method comprising:
a condition determination step of determining conditions of a shot peening treatment by the method for determining the propelling condition for the shot medium according to claim 6; and
a shot peening step of performing a shot peening treatment on a coil spring using the condition determined in the condition determination step.

18. The method for manufacturing the coil spring according to claim 17, wherein
the shot peening treatment is a shot peening treatment performed on the coil spring which is not heated.

* * * * *